(12) United States Patent
Frank et al.

(10) Patent No.: US 8,464,348 B2
(45) Date of Patent: Jun. 11, 2013

(54) ISOLATED COMPUTING ENVIRONMENT ANCHORED INTO CPU AND MOTHERBOARD

(75) Inventors: Alexander Frank, Bellevue, WA (US); Martin H. Hall, Sammamish, WA (US); Thomas G. Phillips, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/022,493

(22) Filed: Dec. 22, 2004

(65) Prior Publication Data
US 2006/0107328 A1 May 18, 2006

Related U.S. Application Data

(63) Continuation-in-part of application No. 11/006,837, filed on Dec. 8, 2004, now abandoned, which is a continuation-in-part of application No. 10/989,122, filed on Nov. 15, 2004, now Pat. No. 7,610,631.

(51) Int. Cl.
*G06F 11/30* (2006.01)
*G06F 12/14* (2006.01)
*G08B 29/00* (2006.01)
*H04L 9/32* (2006.01)

(52) U.S. Cl.
USPC ............... 726/26; 726/34; 713/194; 713/164; 710/200; 711/163

(58) Field of Classification Search
USPC .................... 713/189, 194, 176, 164; 726/26, 726/34; 710/200; 711/163
See application file for complete search history.

(56) References Cited

U.S. PATENT DOCUMENTS

| | | | |
|---|---|---|---|
| 4,620,150 A | 10/1986 | Germer et al. | |
| 4,750,034 A | 6/1988 | Lem | |
| 4,817,094 A | 3/1989 | Lebizay et al. | |
| 4,855,730 A | 8/1989 | Venners et al. | |
| 4,855,922 A | 8/1989 | Huddleston et al. | |
| 4,857,999 A | 8/1989 | Welsh | |
| 4,910,692 A | 3/1990 | Outram et al. | |
| 4,967,273 A | 10/1990 | Greenberg | |

(Continued)

FOREIGN PATENT DOCUMENTS

| | | |
|---|---|---|
| CN | 1531673 | 9/2004 |
| EP | 0635790 | 1/1995 |

(Continued)

OTHER PUBLICATIONS

International Search Report for PCT/US05/40950 mailed Nov. 30, 2006.

(Continued)

*Primary Examiner* — Zachary A Davis

(57) ABSTRACT

A computer is adapted for pay-for-use operation by adding a isolated computing environment to a standard computer. The isolated computing environment may include a trusted non-volatile memory, a digital signature verification capability, a clock or timer and a logic circuit for triggering execution of a validation program responsive to the clock or timer. The isolated computing environment may be protected from tampering by physical or cryptographic mechanisms, or both. The validation program measures or monitors for non-compliant states of the computer and may enforce sanctions when non-compliant states of the computer are detected.

8 Claims, 3 Drawing Sheets

U.S. PATENT DOCUMENTS

| | | | |
|---|---|---|---|
| 5,001,752 A * | 3/1991 | Fischer | 713/178 |
| 5,012,514 A * | 4/1991 | Renton | 713/192 |
| 5,249,184 A | 9/1993 | Woest et al. | |
| 5,274,368 A | 12/1993 | Breeden et al. | |
| 5,301,268 A | 4/1994 | Takeda | |
| 5,355,161 A | 10/1994 | Bird et al. | |
| 5,369,262 A | 11/1994 | Dvorkis et al. | |
| 5,442,704 A | 8/1995 | Holtey | |
| 5,459,867 A | 10/1995 | Adams et al. | |
| 5,473,692 A | 12/1995 | Davis | |
| 5,500,897 A | 3/1996 | Hartman, Jr. | |
| 5,513,319 A * | 4/1996 | Finch et al. | 714/55 |
| 5,522,040 A | 5/1996 | Hofsass et al. | |
| 5,530,846 A | 6/1996 | Strong | |
| 5,563,799 A | 10/1996 | Brehmer et al. | |
| 5,568,552 A | 10/1996 | Davis | |
| 5,671,412 A | 9/1997 | Christiano | |
| 5,710,706 A | 1/1998 | Markl et al. | |
| 5,715,403 A | 2/1998 | Stefik | |
| 5,754,763 A | 5/1998 | Bereiter | |
| 5,758,068 A | 5/1998 | Brandt et al. | |
| 5,763,832 A | 6/1998 | Anselm | |
| 5,768,382 A * | 6/1998 | Schneier et al. | 380/251 |
| 5,771,354 A | 6/1998 | Crawford | |
| 5,774,870 A | 6/1998 | Storey | |
| 5,793,839 A | 8/1998 | Farris et al. | |
| 5,802,592 A * | 9/1998 | Chess et al. | 711/164 |
| 5,825,883 A | 10/1998 | Archibald et al. | |
| 5,841,865 A | 11/1998 | Sudia | |
| 5,844,986 A * | 12/1998 | Davis | 713/187 |
| 5,845,065 A | 12/1998 | Conte et al. | |
| 5,883,670 A | 3/1999 | Sporer et al. | |
| 5,925,127 A | 7/1999 | Ahmad | |
| 5,948,061 A | 9/1999 | Merriman et al. | |
| 5,949,876 A | 9/1999 | Ginter et al. | |
| 5,953,502 A * | 9/1999 | Helbig, Sr. | 726/24 |
| 5,983,238 A | 11/1999 | Becker et al. | |
| 5,994,710 A | 11/1999 | Knee et al. | |
| 6,021,438 A | 2/2000 | Duvvoori | |
| 6,026,293 A * | 2/2000 | Osborn | 455/411 |
| 6,061,794 A | 5/2000 | Angelo et al. | |
| 6,101,606 A | 8/2000 | Diersch et al. | |
| 6,147,773 A | 11/2000 | Taylor | |
| 6,148,417 A * | 11/2000 | da Silva | 714/25 |
| 6,158,657 A | 12/2000 | Hall, III et al. | |
| 6,185,678 B1 | 2/2001 | Arbaugh et al. | |
| 6,188,995 B1 | 2/2001 | Garst et al. | |
| 6,189,146 B1 | 2/2001 | Misra et al. | |
| 6,192,392 B1 | 2/2001 | Ginter | |
| 6,219,652 B1 | 4/2001 | Carter et al. | |
| 6,223,291 B1 | 4/2001 | Puhl | |
| 6,226,747 B1 | 5/2001 | Larsson et al. | |
| 6,230,185 B1 | 5/2001 | Salas et al. | |
| 6,233,600 B1 | 5/2001 | Salas et al. | |
| 6,243,439 B1 | 6/2001 | Arai et al. | |
| 6,253,224 B1 * | 6/2001 | Brice et al. | 718/1 |
| 6,263,431 B1 * | 7/2001 | Lovelace et al. | 713/2 |
| 6,272,469 B1 | 8/2001 | Koritzinsky et al. | |
| 6,279,156 B1 | 8/2001 | Amberg et al. | |
| 6,286,051 B1 | 9/2001 | Becker et al. | |
| 6,289,319 B1 | 9/2001 | Lockwood | |
| 6,303,924 B1 | 10/2001 | Adan et al. | |
| 6,314,408 B1 | 11/2001 | Salas et al. | |
| 6,321,335 B1 | 11/2001 | Chu | |
| 6,327,652 B1 | 12/2001 | England et al. | |
| 6,330,670 B1 * | 12/2001 | England et al. | 713/2 |
| 6,334,189 B1 | 12/2001 | Granger et al. | |
| 6,363,488 B1 | 3/2002 | Ginter et al. | |
| 6,373,047 B1 | 4/2002 | Adan et al. | |
| 6,385,727 B1 | 5/2002 | Cassagnol et al. | |
| 6,408,170 B1 | 6/2002 | Schmidt et al. | |
| 6,411,941 B1 | 6/2002 | Mullor et al. | |
| 6,441,813 B1 | 8/2002 | Ishibashi | |
| 6,442,529 B1 | 8/2002 | Krishan et al. | |
| 6,442,690 B1 | 8/2002 | Howard, Jr. et al. | |
| 6,463,534 B1 | 10/2002 | Geiger et al. | |
| 6,496,858 B1 | 12/2002 | Frailong et al. | |
| 6,571,216 B1 | 5/2003 | Garg et al. | |
| 6,585,158 B2 | 7/2003 | Norskog | |
| 6,587,684 B1 | 7/2003 | Hsu et al. | |
| 6,609,201 B1 | 8/2003 | Folmsbee | |
| 6,625,729 B1 | 9/2003 | Angelo et al. | |
| 6,646,244 B2 | 11/2003 | Aas et al. | |
| 6,664,948 B2 | 12/2003 | Crane et al. | |
| 6,671,803 B1 | 12/2003 | Pasieka | |
| 6,690,556 B2 | 2/2004 | Smola et al. | |
| 6,694,000 B2 | 2/2004 | Ung et al. | |
| 6,704,873 B1 | 3/2004 | Underwood | |
| 6,708,176 B2 | 3/2004 | Strunk et al. | |
| 6,711,263 B1 | 3/2004 | Nordenstam et al. | |
| 6,738,810 B1 * | 5/2004 | Kramer et al. | 709/224 |
| 6,763,458 B1 | 7/2004 | Watanabe et al. | |
| 6,765,470 B2 | 7/2004 | Shinzaki | |
| 6,791,157 B1 * | 9/2004 | Casto et al. | 257/529 |
| 6,816,809 B2 * | 11/2004 | Circenis | 702/178 |
| 6,816,900 B1 | 11/2004 | Vogel et al. | |
| 6,834,352 B2 | 12/2004 | Shin | |
| 6,839,841 B1 | 1/2005 | Medvinsky et al. | |
| 6,844,871 B1 | 1/2005 | Hinckley et al. | |
| 6,847,942 B1 | 1/2005 | Land et al. | |
| 6,851,051 B1 * | 2/2005 | Bolle et al. | 713/168 |
| 6,868,433 B1 | 3/2005 | Philyaw | |
| 6,871,283 B1 | 3/2005 | Zurko et al. | |
| 6,920,567 B1 | 7/2005 | Doherty et al. | |
| 6,934,942 B1 | 8/2005 | Chilimbi | |
| 6,954,728 B1 | 10/2005 | Kusumoto et al. | |
| 6,957,186 B1 | 10/2005 | Guheen et al. | |
| 6,976,162 B1 | 12/2005 | Ellison et al. | |
| 6,983,050 B1 * | 1/2006 | Yacobi et al. | 380/210 |
| 6,986,042 B2 | 1/2006 | Griffin | |
| 6,990,174 B2 | 1/2006 | Eskelinen | |
| 6,993,648 B2 * | 1/2006 | Goodman et al. | 713/2 |
| 7,000,100 B2 | 2/2006 | Lacombe et al. | |
| 7,000,829 B1 | 2/2006 | Harris et al. | |
| 7,054,468 B2 | 5/2006 | Yang | |
| 7,076,652 B2 | 7/2006 | Ginter et al. | |
| 7,096,469 B1 | 8/2006 | Kubala et al. | |
| 7,097,357 B2 | 8/2006 | Johnson et al. | |
| 7,103,574 B1 | 9/2006 | Peinado et al. | |
| 7,113,912 B2 | 9/2006 | Stefik et al. | |
| 7,121,460 B1 | 10/2006 | Parsons et al. | |
| 7,143,297 B2 | 11/2006 | Buchheit et al. | |
| 7,162,645 B2 | 1/2007 | Iguchi et al. | |
| 7,171,539 B2 | 1/2007 | Mansell et al. | |
| 7,174,457 B1 | 2/2007 | England et al. | |
| 7,207,039 B2 | 4/2007 | Komarla et al. | |
| 7,234,144 B2 * | 6/2007 | Wilt et al. | 718/104 |
| 7,236,455 B1 | 6/2007 | Proudler et al. | |
| 7,266,569 B2 | 9/2007 | Cutter et al. | |
| 7,299,358 B2 | 11/2007 | Chateau et al. | |
| 7,353,402 B2 | 4/2008 | Bourne et al. | |
| 7,359,807 B2 | 4/2008 | Frank et al. | |
| 7,360,253 B2 | 4/2008 | Frank et al. | |
| 7,392,429 B2 | 6/2008 | Frank et al. | |
| 7,395,245 B2 | 7/2008 | Okamoto et al. | |
| 7,406,446 B2 | 7/2008 | Frank et al. | |
| 7,421,413 B2 | 9/2008 | Frank et al. | |
| 7,441,121 B2 | 10/2008 | Cutter, Jr. et al. | |
| 7,441,246 B2 | 10/2008 | Auerbach et al. | |
| 7,461,249 B1 | 12/2008 | Pearson et al. | |
| 7,464,103 B2 | 12/2008 | Siu | |
| 7,490,356 B2 | 2/2009 | Lieblich et al. | |
| 7,493,487 B2 | 2/2009 | Phillips et al. | |
| 7,494,277 B2 | 2/2009 | Setala | |
| 7,519,816 B2 | 4/2009 | Phillips et al. | |
| 7,539,863 B2 | 5/2009 | Phillips | |
| 7,540,024 B2 | 5/2009 | Phillips et al. | |
| 7,549,060 B2 | 6/2009 | Bourne et al. | |
| 7,562,220 B2 | 7/2009 | Frank et al. | |
| 7,565,325 B2 | 7/2009 | Lenard et al. | |
| 7,568,096 B2 | 7/2009 | Evans et al. | |
| 7,596,784 B2 * | 9/2009 | Abrams et al. | 717/172 |
| 7,610,631 B2 | 10/2009 | Frank et al. | |
| 7,669,056 B2 | 2/2010 | Frank et al. | |
| 7,694,153 B2 | 4/2010 | Ahdout et al. | |
| 7,770,205 B2 | 8/2010 | Frank | |
| 7,809,646 B2 | 10/2010 | Rose | |

| Patent/Publication | Date | Inventor |
|---|---|---|
| 7,814,532 B2 * | 10/2010 | Cromer et al. ............... 726/2 |
| 7,877,607 B2 * | 1/2011 | Circenis et al. ............... 713/170 |
| 7,891,007 B2 | 2/2011 | Waxman et al. |
| 7,958,029 B1 | 6/2011 | Bobich et al. |
| 7,979,721 B2 | 7/2011 | Westerinen et al. |
| 2001/0034711 A1 | 10/2001 | Tashenberg |
| 2001/0056413 A1 | 12/2001 | Suzuki et al. |
| 2002/0002597 A1 | 1/2002 | Morrell, Jr. |
| 2002/0007310 A1 | 1/2002 | Long |
| 2002/0023212 A1 | 2/2002 | Proudler |
| 2002/0046098 A1 | 4/2002 | Maggio |
| 2002/0055906 A1 | 5/2002 | Katz et al. |
| 2002/0091569 A1 | 7/2002 | Kitaura et al. |
| 2002/0107701 A1 | 8/2002 | Batty et al. |
| 2002/0112171 A1 | 8/2002 | Ginter et al. |
| 2002/0123964 A1 | 9/2002 | Kramer et al. |
| 2002/0124212 A1 | 9/2002 | Nitschke et al. |
| 2002/0129359 A1 | 9/2002 | Lichner |
| 2002/0138549 A1 | 9/2002 | Urien |
| 2002/0141451 A1 | 10/2002 | Gates et al. |
| 2002/0147601 A1 | 10/2002 | Fagan |
| 2002/0147782 A1 | 10/2002 | Dimitrova et al. |
| 2002/0147912 A1 | 10/2002 | Shmueli et al. |
| 2002/0184482 A1 | 12/2002 | Lacombe et al. |
| 2002/0184508 A1 | 12/2002 | Bialick et al. |
| 2002/0193101 A1 | 12/2002 | McAlinden |
| 2002/0194132 A1 * | 12/2002 | Pearson et al. ............... 705/52 |
| 2003/0005135 A1 | 1/2003 | Inoue et al. |
| 2003/0014323 A1 | 1/2003 | Scheer |
| 2003/0027549 A1 | 2/2003 | Kiel et al. |
| 2003/0028454 A1 | 2/2003 | Ooho et al. |
| 2003/0035409 A1 | 2/2003 | Wang et al. |
| 2003/0037246 A1 | 2/2003 | Goodman et al. |
| 2003/0040960 A1 | 2/2003 | Eckmann |
| 2003/0046026 A1 | 3/2003 | Levy et al. |
| 2003/0048473 A1 | 3/2003 | Rosen |
| 2003/0056107 A1 | 3/2003 | Cammack et al. |
| 2003/0084104 A1 | 5/2003 | Salem et al. |
| 2003/0084278 A1 | 5/2003 | Cromer et al. |
| 2003/0084337 A1 | 5/2003 | Simionescu et al. |
| 2003/0084352 A1 * | 5/2003 | Schwartz et al. ............... 713/202 |
| 2003/0088500 A1 | 5/2003 | Shinohara et al. |
| 2003/0093694 A1 | 5/2003 | Medvinsky et al. |
| 2003/0097596 A1 | 5/2003 | Muratov et al. |
| 2003/0115458 A1 * | 6/2003 | Song ............... 713/165 |
| 2003/0126519 A1 | 7/2003 | Odorcic |
| 2003/0131252 A1 | 7/2003 | Barton et al. |
| 2003/0135380 A1 | 7/2003 | Lehr et al. |
| 2003/0149671 A1 | 8/2003 | Yamamoto et al. |
| 2003/0156572 A1 | 8/2003 | Hui et al. |
| 2003/0156719 A1 | 8/2003 | Cronce |
| 2003/0172376 A1 | 9/2003 | Coffin, III et al. |
| 2003/0185395 A1 | 10/2003 | Lee et al. |
| 2003/0188165 A1 | 10/2003 | Sutton et al. |
| 2003/0196102 A1 | 10/2003 | McCarroll |
| 2003/0196106 A1 | 10/2003 | Erfani et al. |
| 2003/0208338 A1 | 11/2003 | Challener et al. |
| 2003/0208573 A1 | 11/2003 | Harrison et al. |
| 2003/0229702 A1 | 12/2003 | Hensbergen et al. |
| 2004/0001088 A1 | 1/2004 | Stancil et al. |
| 2004/0003288 A1 | 1/2004 | Wiseman et al. |
| 2004/0010440 A1 | 1/2004 | Lenard et al. |
| 2004/0019456 A1 | 1/2004 | Circenis |
| 2004/0023636 A1 | 2/2004 | Gurel et al. |
| 2004/0030912 A1 | 2/2004 | Merkle, Jr. et al. |
| 2004/0034816 A1 | 2/2004 | Richard |
| 2004/0039916 A1 | 2/2004 | Aldis et al. |
| 2004/0039924 A1 | 2/2004 | Baldwin et al. |
| 2004/0054907 A1 | 3/2004 | Chateau et al. |
| 2004/0054908 A1 * | 3/2004 | Circenis et al. ............... 713/176 |
| 2004/0059937 A1 | 3/2004 | Nakano |
| 2004/0064707 A1 | 4/2004 | McCann et al. |
| 2004/0067746 A1 | 4/2004 | Johnson |
| 2004/0073670 A1 | 4/2004 | Chack et al. |
| 2004/0088548 A1 | 5/2004 | Smetters et al. |
| 2004/0093371 A1 | 5/2004 | Burrows et al. |
| 2004/0093508 A1 | 5/2004 | Foerstner et al. |
| 2004/0107359 A1 | 6/2004 | Kawano et al. |
| 2004/0107368 A1 | 6/2004 | Colvin |
| 2004/0123127 A1 | 6/2004 | Teicher et al. |
| 2004/0128251 A1 | 7/2004 | Adam et al. |
| 2004/0133794 A1 | 7/2004 | Kocher et al. |
| 2004/0193919 A1 | 9/2004 | Dabbish et al. |
| 2004/0199769 A1 | 10/2004 | Proudler |
| 2004/0205357 A1 | 10/2004 | Kuo et al. |
| 2004/0220858 A1 | 11/2004 | Maggio |
| 2004/0225894 A1 | 11/2004 | Colvin |
| 2004/0255000 A1 | 12/2004 | Simionescu et al. |
| 2005/0021944 A1 * | 1/2005 | Craft et al. ............... 713/161 |
| 2005/0028000 A1 | 2/2005 | Bulusu et al. |
| 2005/0033747 A1 | 2/2005 | Wittkotter |
| 2005/0039013 A1 | 2/2005 | Bajikar et al. |
| 2005/0050355 A1 | 3/2005 | Graunke |
| 2005/0060388 A1 | 3/2005 | Tatsumi et al. |
| 2005/0065880 A1 | 3/2005 | Amato et al. |
| 2005/0080701 A1 | 4/2005 | Tunney et al. |
| 2005/0091104 A1 | 4/2005 | Abraham |
| 2005/0097204 A1 | 5/2005 | Horowitz et al. |
| 2005/0102181 A1 | 5/2005 | Scroggie et al. |
| 2005/0108547 A1 | 5/2005 | Sakai |
| 2005/0108564 A1 | 5/2005 | Freeman et al. |
| 2005/0125673 A1 | 6/2005 | Cheng et al. |
| 2005/0129296 A1 | 6/2005 | Setala |
| 2005/0138370 A1 | 6/2005 | Goud et al. |
| 2005/0138389 A1 | 6/2005 | Catherman et al. |
| 2005/0138423 A1 | 6/2005 | Ranganathan |
| 2005/0141717 A1 | 6/2005 | Cromer et al. |
| 2005/0144099 A1 | 6/2005 | Deb et al. |
| 2005/0166051 A1 | 7/2005 | Buer |
| 2005/0182921 A1 | 8/2005 | Duncan |
| 2005/0182940 A1 | 8/2005 | Sutton |
| 2005/0188843 A1 | 9/2005 | Edlund et al. |
| 2005/0203801 A1 | 9/2005 | Morgenstern et al. |
| 2005/0213761 A1 | 9/2005 | Walmsley et al. |
| 2005/0216577 A1 | 9/2005 | Durham et al. |
| 2005/0221766 A1 | 10/2005 | Brizek et al. |
| 2005/0235141 A1 | 10/2005 | Ibrahim et al. |
| 2005/0240533 A1 | 10/2005 | Cutter et al. |
| 2005/0246521 A1 | 11/2005 | Bade et al. |
| 2005/0246525 A1 | 11/2005 | Bade et al. |
| 2005/0246552 A1 | 11/2005 | Bade et al. |
| 2005/0257073 A1 | 11/2005 | Bade |
| 2005/0275866 A1 | 12/2005 | Corlett |
| 2005/0278519 A1 | 12/2005 | Luebke et al. |
| 2005/0279827 A1 | 12/2005 | Mascavage et al. |
| 2005/0286476 A1 | 12/2005 | Crosswy et al. |
| 2005/0289177 A1 | 12/2005 | Hohmann, II |
| 2005/0289343 A1 | 12/2005 | Tahan |
| 2006/0010326 A1 | 1/2006 | Bade et al. |
| 2006/0015717 A1 | 1/2006 | Liu et al. |
| 2006/0015718 A1 | 1/2006 | Liu et al. |
| 2006/0015732 A1 | 1/2006 | Liu |
| 2006/0020784 A1 | 1/2006 | Jonker et al. |
| 2006/0026418 A1 | 2/2006 | Bade |
| 2006/0026419 A1 | 2/2006 | Arndt et al. |
| 2006/0026422 A1 | 2/2006 | Bade et al. |
| 2006/0055506 A1 | 3/2006 | Nicolas |
| 2006/0072748 A1 | 4/2006 | Buer |
| 2006/0074600 A1 | 4/2006 | Sastry et al. |
| 2006/0075014 A1 | 4/2006 | Tharappel et al. |
| 2006/0085634 A1 | 4/2006 | Jain et al. |
| 2006/0085637 A1 | 4/2006 | Pinkas |
| 2006/0089917 A1 | 4/2006 | Strom et al. |
| 2006/0100010 A1 * | 5/2006 | Gatto et al. ............... 463/29 |
| 2006/0106845 A1 | 5/2006 | Frank et al. |
| 2006/0106920 A1 | 5/2006 | Steeb et al. |
| 2006/0156008 A1 | 7/2006 | Frank et al. |
| 2006/0165005 A1 | 7/2006 | Frank et al. |
| 2006/0168664 A1 | 7/2006 | Frank et al. |
| 2006/0206618 A1 | 9/2006 | Zimmer et al. |
| 2006/0213997 A1 | 9/2006 | Frank et al. |
| 2006/0282319 A1 | 12/2006 | Maggio |
| 2006/0282899 A1 | 12/2006 | Raciborski |
| 2007/0033102 A1 | 2/2007 | Frank et al. |
| 2007/0280422 A1 | 12/2007 | Setala |
| 2009/0070454 A1 | 3/2009 | McKinnon, III et al. |
| 2012/0137127 A1 | 5/2012 | Jain |

FOREIGN PATENT DOCUMENTS

| | | |
|---|---|---|
| EP | 0843449 | 5/1998 |
| EP | 1061465 | 12/2000 |
| EP | 1085396 | 3/2001 |
| EP | 1387237 | 2/2004 |
| EP | 1429224 | 6/2004 |
| EP | 1223722 | 8/2004 |
| EP | 1460514 | 9/2004 |
| EP | 1233337 | 8/2005 |
| GB | 2359969 | 9/2001 |
| GB | 2378780 | 2/2003 |
| GB | 2378780 A * | 2/2003 |
| JP | H0535461 | 2/1993 |
| JP | H0635718 | 2/1994 |
| JP | H07036559 | 2/1995 |
| JP | H07141153 | 6/1995 |
| JP | H086729 | 1/1996 |
| JP | H08-054952 | 2/1996 |
| JP | 2001526550 | 5/1997 |
| JP | H09185504 | 7/1997 |
| JP | H9251494 | 9/1997 |
| JP | 2000293369 | 10/2000 |
| JP | 2001051742 | 2/2001 |
| JP | 2003510684 | 3/2001 |
| JP | 2001101033 | 4/2001 |
| JP | 2003510713 | 4/2001 |
| JP | 2001184472 | 7/2001 |
| JP | 2001312325 | 11/2001 |
| JP | 2001331229 | 11/2001 |
| JP | 2001338233 | 12/2001 |
| JP | 2002108478 | 4/2002 |
| JP | 2002108870 | 4/2002 |
| JP | 2002374327 | 12/2002 |
| JP | 2003507785 | 2/2003 |
| JP | 2003140761 | 5/2003 |
| JP | 2003140762 | 5/2003 |
| JP | 2003157335 | 5/2003 |
| JP | 2003208314 | 7/2003 |
| JP | 2003248522 | 9/2003 |
| JP | 2003296487 | 10/2003 |
| JP | 2004031474 | 1/2004 |
| JP | 2004062561 | 2/2004 |
| JP | 2004118327 | 4/2004 |
| JP | 2004164491 | 6/2004 |
| JP | 2004295846 | 10/2004 |
| JP | 2004304755 | 10/2004 |
| JP | 2007525774 | 9/2007 |
| KR | 20010000805 | 1/2001 |
| KR | 20020037453 | 5/2002 |
| KR | 20050008439 | 1/2005 |
| KR | 20050021782 | 3/2005 |
| WO | WO-9721162 | 6/1997 |
| WO | WO-9811478 | 3/1998 |
| WO | WO-0054126 | 9/2000 |
| WO | WO-0135293 | 5/2001 |
| WO | WO-0145012 | 6/2001 |
| WO | WO-0163512 | 8/2001 |
| WO | WO-0177795 | 10/2001 |
| WO | WO-0193461 | 12/2001 |
| WO | WO-0208969 | 1/2002 |
| WO | WO-02056155 | 7/2002 |
| WO | WO-02103495 | 12/2002 |
| WO | WO-03009115 | 1/2003 |
| WO | WO-03030434 | 4/2003 |
| WO | WO-03073688 | 9/2003 |
| WO | WO-03107585 | 12/2003 |
| WO | WO-03107588 | 12/2003 |
| WO | WO-2004092886 | 10/2004 |
| WO | WO-2007032974 | 3/2007 |

OTHER PUBLICATIONS

Written Opinion for PCT/US05/40950 mailed Nov. 30, 2006.
International Search Report for PCT/US2006/034622 mailed Jan. 16, 2007.
Written Opinion for PCT/US2006/034622 mailed Jan. 16, 2007.
"International Search Report and Written Opinion mailed Apr. 22, 2008", Application No. PCT/US2007/087960, 7 pages.
Eren, H. et al., "Fringe-Effect Capacitive Proximity Sensors for Tamper Proof Enclosures", *Proceedings of 2005 Sensors for Industry Conference*, (Feb. 2005),pp. 22-25.
"International Search Report and Written Opinion mailed Nov. 15, 2004", Application No. PCT/US05/40966, 9 pages.
Schneier, B. "Applied Cryptography, Second Edition: Protocols, Algorithms, and Source Code in C (cloth)", (Jan. 1, 1996),13 pages.
Goering, Richard "Web Venture Offers Metered Access to EDA Packages—Startup Winds Clocks by the Hour Tools (E*CAD Will Launch Web Site That Provides Pay-Per-Use and Pay-Per-Hour Access to Range of Chip Design Software)", *Electronic Engineering Times*, (Nov. 6, 2000),3 pages.
Zemao, Chen et al., "A Malicious Code Immune Model Based on Program Encryption", *IEEE—Wireless Communication, Networking and Mobile Computing*, WICOM '08, 4th International Conference on Oct. 12-14, 2008,(2008),5 pages.
Mufti, Dr. Muid et al., "Design and Implementation of a Secure Mobile IP Protocol", *Networking and Communication, INCC 204*, International Conference on Jun. 11-13, 2004,(2004),5 pages.
Davida, George I., et al., "UNIX Guardians: Active User Intervention in Data Protection", *Aerospace Computer Security Applications Conference, Fourth Dec. 12-16*, (1988),6 pages.
Morales, Tatiana "Understanding Your Credit Score", http://www.cbsnews.com/stories/2003/04/29/earlyshow/contributors/raymartin/main55152.shtml retrieved from the Intenet on Apr. 23, 2009,3 pages.
"Achieving Peak Performance: Insights from a Global Survey on Credit Risk and Collections Practices", *GCI Group Pamphlet*, (2002, 2004),12 pages.
"Equifax Business Solutions—Manage Your Customers", *Retrieved from the Internet from* http://www.equifax.com/sitePages/biz/smallBiz/?sitePage=manage Customers on Oct. 14, 2005, 3 pages.
"Prequalification Using Credit Reports", *Retrieved from the Internet at* http://www.credco.com/creditreports/prequalification.htm on Oct. 14, 2005, 2 pages.
Gao, Jerry et al., "Online Advertising—Taxonomy and Engineering Perspectives", http://www.enqr.sjsu.edu/gaojerry/report/OnlineAdvertising%20.pdf, (2002),33 pages.
Oshiba, Takashi et al., "Personalized Advertisement-Duration Control for Streaming Delivery", *ACM Multimedia*, (2002),8 pages.
Yue, Wei T., et al., "The Reward Based Online Shopping Community", *Routledge*, vol. 10, No. 4, (Oct. 1, 2000),2 pages.
"International Search Report and Written Opinion mailed Nov. 8, 2007", Application No. PCT/US05/40967, 5 pages.
"Final Office Action mailed Feb. 7, 2011", U.S. Appl. No. 11/152,214, 15 pages.
"Non-Final OA Mailed Aug. 30, 2010", U.S. Appl. No. 11/152,214, 12 pages.
"Final Office Action mailed May 11, 2010", U.S. Appl. No. 11/152,214, 23 pages.
"Non-Final Office Action mailed Jul. 30, 2009", U.S. Appl. No. 11/152,214, 17 pages.
"Final Office Action mailed Nov. 18, 2008", U.S. Appl. No. 11/152,214, 16 pages.
"Non-Final Office Action mailed Apr. 15, 2008", U.S. Appl. No. 11/152,214, 14 pages.
"Advisory Action mailed Jan. 31, 2011", U.S. Appl. No. 11/006,837, 3 pages.
"Final Office Action mailed Nov. 18, 2010", U.S. Appl. No. 11/006,837, 22 pages.
"Non-Final Office Action mailed May 12, 2010", U.S. Appl. No. 11/006,837, 27 pages.
"Advisory Action mailed Mar. 1, 2010", U.S. Appl. No. 11/006,837, 3 pages.
"Final Office Action mailed Nov. 10, 2009", U.S. Appl. No. 11/006,837, 24 pages.
"Non-Final Office Action mailed Apr. 10, 2009", U.S. Appl. No. 11/006,837, 18 pages.
"Notice of Allowance mailed Jun. 18, 2009", U.S. Appl. No. 10/989,122, 14 pages.
"Non-Final Office Action mailed Feb. 4, 2009", U.S. Appl. No. 10/989,122, 13 pages.
"Non-Final Office Action mailed Aug. 6, 2008", U.S. Appl. No. 10/989,122, 12 pages.

"Non-Final Office Action mailed Jan. 16, 2008", U.S. Appl. No. 10/989,122, 10 pages.
"Final Office Action mailed Mar. 28, 2007", U.S. Appl. No. 10/989,122, 22 pages.
Qiao, Daji et al., "MiSer: An Optimal Low-Energy Transmission Strategy for IEEE 802.11 a/h", *obtained from ACM*, (Sep. 2003),pp. 161-175.
"Non-Final Office Action mailed Aug. 24, 2006", U.S. Appl. No. 10/989,122, 20 pages.
"European Search Report", Mailed Date: Dec. 6, 2010, Application No. EP/05820177, Filed Date: Dec. 7, 2010, pp. 8.
"International Search Report and Written Opinion", Application Serial No. PCT/US05/40940, 18 pages.
"EP Summons to Attend Oral Proceedings mailed Sep. 27, 2007", Application No. 05110697.9, 7 pages.
"Decision to Refuse a European Application mailed Feb. 15, 2008", Application No. 05110697.9, 45 pages.
"International Search Report and Written Opinion mailed Sep. 25, 2007", Application No. PCT/US06/12811, 10 pages.
"Examiner's First Report mailed Sep. 15, 2009", AU Application No. 2006220489, 2 pages.
"Notice of Acceptance mailed Jan. 25, 2010", AU Application No. 2006220489, 2 pages.
"The First Office Action mailed Aug. 22, 2008", CN Application No. 200680006199.2, 23 pages.
"The Second Office Action mailed Feb. 20, 2009", CN Application No. 200680006199.2, 9 pages.
"The Fourth Office Action mailed Jan. 8, 2010", CN Application No. 200680006199.2, 10 pages.
"The Fifth Office Action mailed Jul. 14, 2010", CN Application No. 200680006199.2, 6 pages.
"Notice on Grant of Patent mailed Oct. 20, 2010", CN Application No. 200680006199.2, 4 pages.
"First Office Action mailed Aug. 21, 2009", CN Application No. 200680030846.3, 8 pages.
"Notice on the First Office Action mailed Dec. 11, 2009", CN Application No. 200510127170.7, 16 pages.
"Notice of Rejection mailed Jun. 21, 2011", JP Application No. 2005-330496, 6 pages.
"The Third Office Action mailed Jun. 5, 2009", CN Application No. 200680006199.2, 7 pages.
"Notice of Rejection mailed Sep. 9, 2011", JP Application No. 2007-548385, 9 pages.
Lampson, Butler et al., "Authentication in Distributed Systems: Theory and Practice", *ACM Transactions on Computer Systems*, v10, 265,(1992),18 pages.
"DMOD WorkSpace OEM Unique Features", www.dmod.com/oem_features, Retrieved from the Internet on Jan. 12, 2005,3 pages.
"Office Action mailed Jun. 29, 2009", Mexican Application No. MX/a/2007/005657, 2 pages.
"Search Report Dated Jan. 11, 2008", EP Application No. 05820090.8, 7 pages.
"Examination Report mailed Mar. 5, 2008", EP Application No. 05820090.8, 1 page.
"First Office Action mailed Apr. 11, 2008", Chinese Application No. 200580038813.9, 11 pages.
"Office Action mailed Jun. 29, 2009", Mexican Application No. MX/a/2007/005656, 6 pages.
"Office Action mailed Nov. 30, 2009", Mexican Application No. MX/a/2007/005659, 6 pages.
"Second Office Action mailed Dec. 18, 2009", Chinese Application No. 200580038812.4, 24 pages.
"Third Office Action mailed Apr. 1, 2010", Chinese Application No. 200580038812.4, 9 pages.
"Notice on Grant of Patent Right for Invention mailed May 5, 2011", Chinese Application No. 200580038812.4, 4 pages.
"Office Action mailed Jul. 7, 2009", Mexican Application No. MX/a/2007/005660, 8 pages.
"Extended European Search Report mailed Aug. 13, 2010", EP Application No. 05823253.9, 7 pages.
"Notice on the First Office Action mailed Sep. 27, 2010", Chinese Application No. 20050038745.6, 6 pages.
"Office Action mailed Jul. 8, 2009", Mexican Application No. MX/a/2007/005662, 7 pages.
"Partial Search Report mailed Jul. 23, 2010", EP Application No. 05821183.0.
"Extended European Search Report mailed Jan. 7, 2011", EP Application No. 05821183.0, 9 pages.
"Notice of Allowance mailed Dec. 25, 2009", Chinese Application No. 200580038773.8, 4 pages.
"Office Action mailed Jun. 26, 2009", Mexican Application No. MX/a/2007/005655, 5 pages.
"Office Action mailed Feb. 9, 2010", Mexican Application No. MX/a/2007/005855, 6 pages.
"Office Action mailed Sep. 24, 2010", Mexican Application No. MX/a/2007/005655, 3 pages.
"Office Action mailed Mar. 19, 2010", EP Application No. 05819896.1, 1 page.
"Office Action mailed Feb. 10, 2010", Mexican Applicaiton No. MX/a/2007/005656, 5 pages.
"Office Action mailed Oct. 18, 2010", Mexican Application No. MX/a/2007/005656, 3 pages.
"Notice on the First Office Action mailed Jul. 30, 2010", Chinese Application No. 200680033207.2, 7 pages.
"Flonix: USB Desktop OS Solutions Provider, http://www.flonix.com", *Retrieved from the Internet Jun. 1, 2005*, (Copyright 2004),2 pages.
"Migo by PowerHouse Technologies Group, http://www.4migo.com", *Retrieved from the Internet Jun. 1, 2005*, (Copyright 2003),3 pages.
"WebServUSB, http://www.webservusb.com", *Retrieved from the Internet Jun. 1, 2005*, (Copyright 2004),16 pages.
"Notice of Rejection mailed Jul. 5, 2011", Japanese Application No. 2007-541363, 10 pages.
"Notice of Rejection mailed Aug. 5, 2011", Japanese Patent Application No. 2007-552142, 8 pages.
"Forward Solutions Unveils Industry's Most Advanced Portable Personal Computing System on USB Flash Memory Device", *Proquest, PR Newswire*, http://proquest.umi.com/pqdweb?index=20&did=408811931&SrchMode=1&sid=6&Fmt=3, Retrieved from the Internet Feb. 15, 2008,(Sep. 22, 2003),3 pages.
"Office Action mailed May, 26, 2008", EP Application No. 05109616.2, 5 pages.
"Notice on Division of Application mailed Aug. 8, 2008", CN Application No. 200510113398.0, (Aug. 8, 2008),2 pages.
"Notice on First Office Action mailed Dec. 12, 2008", CN Application No. 200510113398.0.
"The Second Office Action mailed Jul. 3, 2009", CN Application No. 200510113398.0, 7 pages.
"Notice on Proceeding with the Registration Formalities mailed Oct. 23, 2009", CN Application No. 200510113398.0, 4 pages.
"Examiner's First Report on Application mailed Jun. 4, 2010", AU Application No. 2005222507, 2 pages.
"Notice of Acceptance mailed Oct. 14, 2010", AU Application No. 2005222507, 3 pages.
"Decision on Grant of a Patent for Invention mailed Apr. 29, 2010", Russian Application No. 2005131911, 31 pages.
"TCG Specification Architecture Overview", *Revision 1.2*, (Apr. 28, 2004),55 pages.
"International Search Report and Written Opinion mailed Jun. 19, 2007", PCT Application No. PCT/US05/46091, 11 pages.
"Notice on Grant of Patent Right for Invention mailed Jan. 29, 2010", CN Application No. 200580040764.2, 4 pages.
"Notice of Rejection mailed Jun. 17, 2011", Japanese Application No. 2007-541361 3 pages.
"Extended European Search Report mailed Dec. 6, 2010", EP Application No. 05820177.3, 8 pages.
"Extended European Search Report mailed Jan. 21, 2010", EP Application No. 05819896.1, 8 pages.
"Office Action mailed May 22, 2009", Chinese Application No. 200580038771.9, 5 pages.
"Notice of Rejection mailed Jul. 12, 2011", JP Application No. 2007-541351, 4 pages.
"Notice of Rejection mailed Jul. 22, 2011", JP Application No. 2007-541362.

"Notice of Rejection mailed Jul. 15, 2011", JP Application No. 2007-541356, 4 pages.

"Notice of Rejection mailed Jul. 26, 2011", JP Application No. 2007-541352, 5 pages.

"Notice of Rejection mailed Jul. 22, 2011", JP Application No. 2007-541355, 4 pages.

"Non-Final Office Action mailed Dec. 12,2011", U.S. Appl. No. 10/988,907.

"Notice of Allowance mailed Dec. 30, 2011", U.S. Appl. No. 11/018,095.

"EP Office Action mailed Mar. 8, 2012", EP Application No. 05109616.2, 6 pages.

"EP Search Report mailed Mar. 8, 2012", EP Application No. 05109616.2, 6 pages.

"Notice of Rejection mailed Nov. 11, 2011", Japanese Application No. 2005-301957, 11 pages.

"Extended European Search Report mailed Dec. 21, 2011", EP Application No. 05854752.2, 7 pages.

"Final Rejection mailed Jan. 17, 2012", Japan Application No. 2007/552142, 8 pages.

"Office Action mailed Dec. 7, 2011", JP Application No. 2008-528054, 7 pages.

"International Search Report and Written Opinion", Application Serial No. PCT/US05/40940, 18 pages, mailed Jun. 18, 2008.

"International Search Report and Written Opinion mailed Apr. 25, 2007", Application No. PCT/US05/40965, 5 pages.

"International Search Report and Written Opinion mailed Sep. 25, 2006", Application No. PCT/US05/40949, 7 pages.

"EP Office Action Mailed Nov. 17, 2006", Application No. 05110697.9, 6 pages.

"EP Office Action mailed Apr. 5, 2007", Application No. 05110697.9, 5 pages.

"EP Summons to Attend Oral Proceedings mailed Sep. 27, 2007", Application No.05110697.9, 7 pages.

"Decision to Refuse a European Application mailed Feb. 15, 2008", Application No.05110697.9, 45 pages.

"International Search Report and Written Opinion mailed Sep. 8, 2006", Application No. PCT/US05/40942, 20 pages.

"Notice of Preliminary Rejection mailed May 30, 2012", Korean Patent Application No. 10-2007-7011069, 1 page.

Mois, Dan et al., "Reconfiguration Security for Hardware Agents in Testing", Automation Quality and Testing Robotics (AQTR), 2010 IEEE International Conference on Volume: 2, (2010), pp. 1-5.

Zhang, Kai et al., "Reconfigurable Security Protection System Based on Net FPGA and Embedded Soft-Core Technology", *Computer Design and Applications (ICCDA), 2010 International Conference on Volume*, (2010), pp. V5-540-V5-544.

Ooi, Joo G., et al., "A Proof of Concept on Defending Cold Boot Attack", *Quality Electronic Design, ASQED 2009, 1st Asia Symposium*, (2009), pp. 330-335.

Utagawa, Mari et al., "Creation of Card Application by IC Card OS 'MULTOS' Which Can Rewrite Application", Interface, vol. 29, No. 3, ISSN: 0387-9569, CQ Publishing Co. Ltd., (Mar. 1, 2003), pp. 46-55.

"Notice of Rejection mailed Nov. 11, 2011", Japanese Application No. 2005-301957, 11 pages (in Japanese).

"Final Rejection mailed Jan. 17, 2012", Japan Application No. 2007-552142, 8 pages (in Japanese).

"Office Action mailed Jul. 4, 2012", Korean Application No. 10-2007-7012294, 2 pages.

Extended European Search Report; EP Application No. 05851550.3 of Jul. 5, 2012; 6 pages 6.

"Office Action mailed Jun. 8, 2012", Japanese Application No. 2005-301957, 8 pages.

Nakajima, S; "Do You Really Know It? Basics of Windows2000/XP, Network, 4th Installment, What Is Logon Like?," Nikkei Windows for IT professionals, Jan. 2004 (No. 82); pp. 116-121; Nikkei Business Publications, Inc., Jan. 1, 2004; ISSN: 1346-8308.

"First Special Feature, Security-oriented Web Application Development, Part 3, Method for Realizing Secure Session Management," N+I Network Guide, Jan. 2004 (vol. 4, No. 1, Serial No. 32); pp. 47-59; Softbank Publishing Inc., Jan. 1, 2004.

Reexamination U.S. Appl. No. 90/011,186, filed Aug. 25, 2010.

Chinese PT Appln. 200580044294.7; Second Office Action dated Mar. 4, 2013; 7 pages.

Canadian PT Appln. 2,597,231; Office Action dated Jan. 4, 2013; 4 pages.

* cited by examiner

ISOLATED COMPUTING ENVIRONMENT ANCHORED INTO CPU AND MOTHERBOARD

This application is a continuation-in-part of co-pending application "Method for pay-as-you-go Computer and Dynamic Differential Pricing," filed Dec. 8, 2004, U.S. patent application Ser. No. 11/006,837, which is a continuation-in-part of co-pending application, "Method and Apparatus for Provisioning Software," filed Nov. 15, 2004, U.S. patent application Ser. No. 10/989,122.

BACKGROUND

Pay-as-you-go or pay-per-use business models have been used in many areas of commerce, from cellular telephones to commercial Laundromats. In developing a pay-as-you go business, a provider, for example, a cellular telephone provider, offers the use of hardware (a cellular telephone) at a lower-than-market cost in exchange for a commitment to remain a subscriber to their network. In this specific example, the customer receives a cellular phone for little or no money in exchange for signing a contract to become a subscriber for a given period of time. Over the course of the contract, the service provider recovers the cost of the hardware by charging the consumer for using the cellular phone.

The pay-as-you-go business model is predicated on the concept that the hardware provided has little or no value, or use, if disconnected from the service provider. To illustrate, should the subscriber mentioned above cease to pay his or her bill, the service provider deactivates their account, and while the cellular telephone may power up, calls cannot be made or received because the service provider will not allow communication to the cellular telephone. The deactivated phone has no "salvage" value, because the phone will not work elsewhere and the component parts do not have a significant street value. When the account is brought current, the service provider will re-allow use of the device to make calls.

This model works well when the service provider, or other entity taking the financing risk, has a tight control on the use of the hardware. The model does not work well when the hardware has substantial uses outside the service provider's span of control, such as that of a computer, where the computer may be useful whether connected to a service provider network or not. Therefore there is a need to monitor and correct unauthorized configuration of a computer that could move the computer beyond the service provider's span of control.

SUMMARY

According to one aspect of the disclosure, an isolated computing environment may provide for securely storing programs and information used to monitor and enforce policies related to configuration and operation of a computer. The isolated computing environment may have a secure memory, for storing or validating verification and enforcement programs, cryptographic keys and other data requiring limited access. The isolated computing environment may further have a clock or timer and a logic circuit responsive to the clock or timer for activating the verification program. When a state of the computer is determined not to be in compliance with terms required under a pay-per-use or other business agreement, the enforcement program may initiate a sanction, to correct or encourage a user to correct the non-compliant state of the computer.

A method for assembling a computer using an isolated computing environment may include disposing the isolated computing environment on a motherboard of the computer, either directly or indirectly, and may include attaching the isolated computing environment to the motherboard in a manner that irreparably damages the computer if removed. The isolated computing environment may also be tested as part of the assembly process.

DETAILED DESCRIPTION OF VARIOUS EMBODIMENTS

Figure 1:
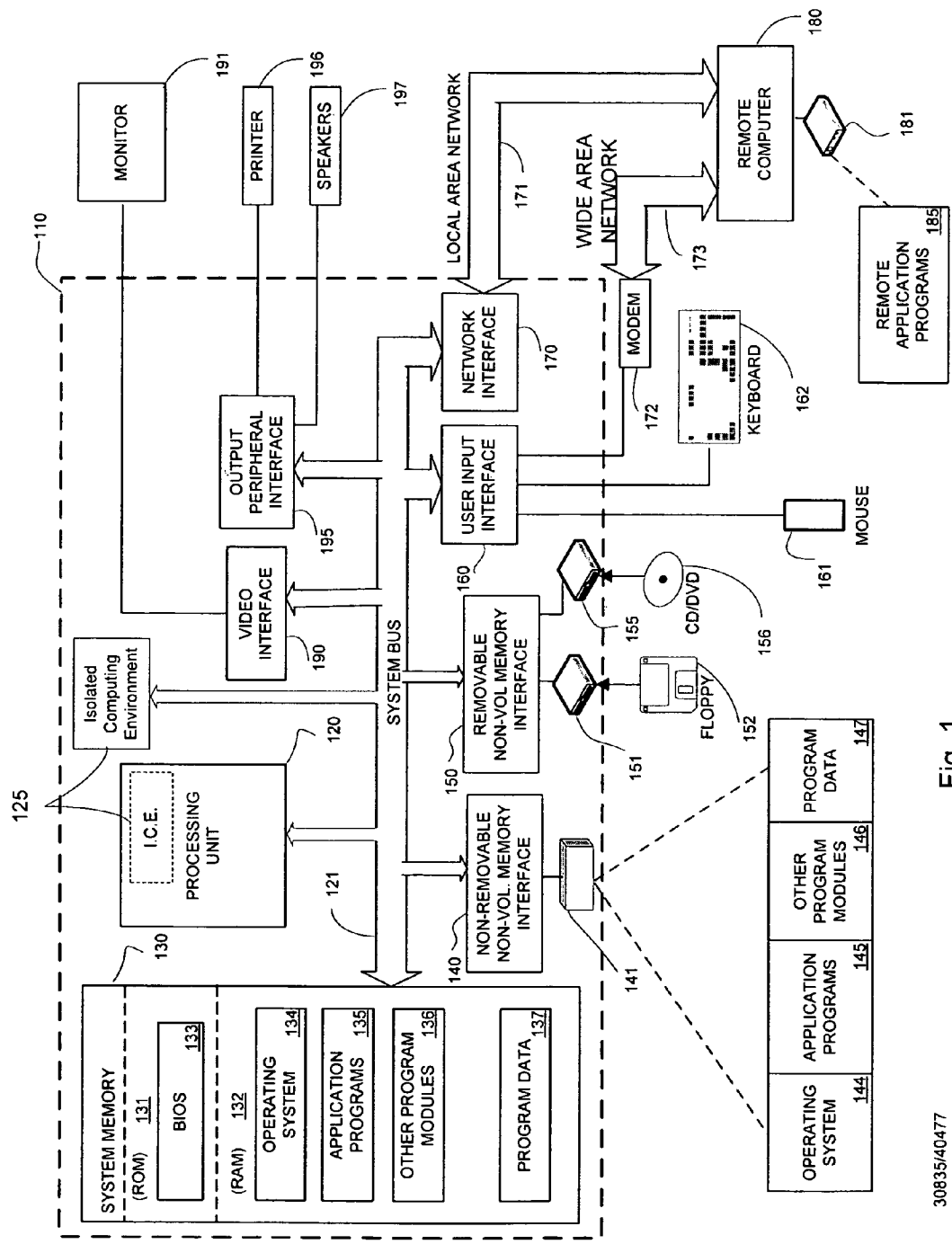
FIG. 1 is a simplified and representative block diagram of a computer.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Many prior art high-value computers, personal digital assistants, organizers and the like may not be suitable for use in a pre-pay or pay-for-use business model without additional security. As discussed above, such equipment may have significant functions apart from those requiring a service provider. For example, a personal computer can be disconnected from a provided Internet service and still be useful for word processing, spreadsheets, etc. In the case where a service provider, for example an Internet service provider or other business entity, underwrites the cost of the personal computer with the expectation of future fees, this "untethered value" creates an opportunity for fraudulent applications and theft. Pre-pay business models, where a user pays in advance for use of a subsidized, high value computing system environment is one example of such a risk for fraud and theft.

FIG. 1 illustrates a computing device in the form of a computer 110. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181.

The communications connections 170 and 172 allow the device to communicate with other devices. The communications connections 170 and 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Figure 2:
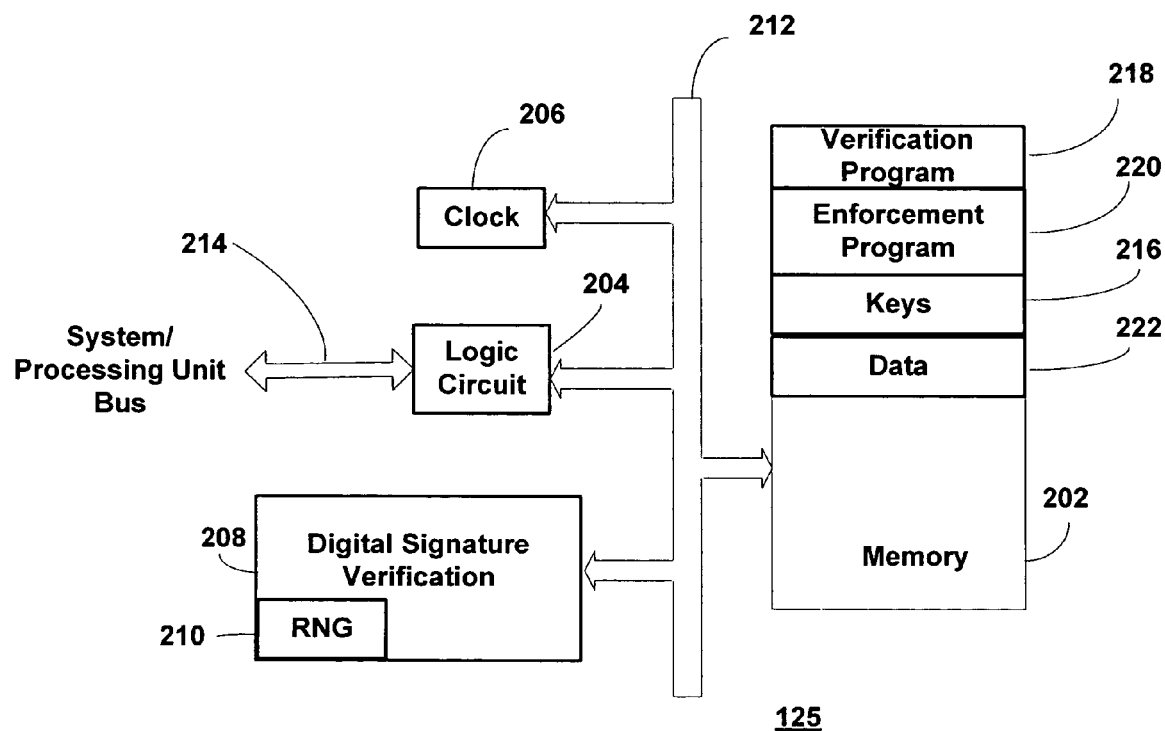
FIG. 2 is a block diagram of a simplified isolated computing environment.

The isolated computing environment 125, discussed in more detail with respect to FIG. 2 may store and cause execution of programs and data. The isolated computing environment 125 may be deployed and configured to enforce the terms of an agreement between a user of the computer 110 and a service provider with an interest in the computer 110.

The isolated computing environment 125 may be instantiated in more than one manner. When implemented by one or more discrete components, the isolated computing environment 125 may be disposed on the motherboard (not depicted) of the computer. The motherboard may be any circuit interconnect and component mounting base technology suitable for a given application and may range from a fiberglass material, to molded epoxy resin, mylar, ceramic, etc. When the isolated computing environment 125 is disposed on or in the motherboard, the isolated computing environment 125 may be coated in an epoxy or buried beneath interconnect layers or components. Coating or burying the isolated computing environment 125 may serve to increase the difficulty of removing or tampering with the isolated computing environment 125 itself, associated power and ground connections to the isolated computing environment 125 or data and address connections to the isolated computing environment 125. Ideally, the removal or de-lidding of the isolated computing environment 125 causes permanent damage to the motherboard and/or surrounding components and renders the computer 110 inoperable.

Another instantiation of the isolated computing environment 125 may be as depicted in FIG. 1, where the isolated computing environment 125 is incorporated in the processing unit 120. Being so disposed in the processing unit may offer advantages of better access to processing unit registers and monitoring of data sequences as well as improved resistance to physical attacks.

Referring to FIG. 2, a simplified and representative isolated computing environment is discussed and described. The isolated computing environment may be or may be similar to the isolated computing environment 125 introduced above. The isolated computing environment 125 may include a memory 202, a logic circuit 204 and a timer or clock 206. The isolated computing environment 125 may further include a digital signature verification circuit 208. When one-way verification of an external entity is required, for example, verification of a server (not depicted), a random number generator 210 may be a part of the digital signature verification circuit 208. Digital signature technology is well known and hashing, signature verification, symmetric and asymmetric algorithms and their respective keys are not discussed here in detail.

The blocks of the isolated computing environment 125 may be coupled by a bus 212. The bus 212 may be separate from a system or processing unit bus 214 used for external access. Separating the busses may improve security by limiting access to data passed by bus 212. The bus 212 may incorporate security precautions such as balanced data lines to make power attacks on cryptographic keys 216 stored in the memory 202 more difficult.

The memory 202, in addition to storing cryptographic keys 216, may store at least one verification program 218 and at least one enforcement program 220. These programs are discussed in more detail below. Other data 222 may be stored in the memory 202, for example, hash codes and/or other digital signature information associated with known BIOS code or application programs. Another example of data 222 that may be stored in memory 202 is certificate information for verification of downloaded updates to verification programs 218 or enforcement programs 220.

The validation and enforcement programs 218 and 220 are shown stored in the isolated computing environment 125, but may also be stored externally, with a digital signature or hash of the programs stored in the isolated computing environment 125, for example, in the data section 222 of the memory 202. When monitoring or measuring an application program, the isolated computing environment 125 may validate a hash or digital signature of the application program before or during the program's execution. Since the programs 218 and 220 and data stored in memory 202 are part of the security associated with the success of the pay-as-you-go, pay-per-use business model, it may be important that the data be protected from unauthorized access and tampering. Unauthorized access of the memory 202 may be limited using either the logic circuit 204 or the digital signature verification circuit 208 or a combination of the two. The access to the memory may be restricted to processes running a known program code, i.e. a program code trusted by the isolated computing environment 125. The program code may be the validation program 218 or the enforcement program 220. However, other programs may be granted access to the memory 202. For example, an application supporting the management of usage credits or balances may use the memory of the isolated computing environment 125. When repair or maintenance is required, access to the memory 202 may be granted to a service process supported on a networked device having proper credentials in order to effect the repair.

The isolated computing environment 125 may have several functions. One function of the isolated computing environment 125 is to protect itself from unauthorized updates and tampering. Programs and data stored in the isolated computing environment 125 may be injected at the time of manufacture or may be downloaded if correctly signed with the signature authenticated by the isolated computing environment 125 itself. Another function may be to monitor and/or measure the state of the computer 110 to determine if a hack or other unauthorized change in the state of the computer 110 is in process or has occurred. Another aspect of monitoring and measuring may be to support legitimate changes of state of the computer 110 related to functions associated with provisioning resources and hosting secure functions such as an event dispatcher or balance manager. A third function may be to validate current BIOS code and validate updates and extensions to BIOS code. Another function of the isolated computing environment 125 may be to provide a reliable clock or timer both as a source of time for metering programs and expiration dates. The clock or timer may also ensure that the isolated computing environment 125 is routinely granted access to the computer 110 and not "starved" for CPU cycles. Another function may be to enforce sanctions when a non-compliant state is determined in the computer 110.

To protect from unauthorized updates and tampering the memory 202 may be secured. To accomplish this, the memory 202 may be made accessible only to a specific program, for example, an update routine authenticated by a digital signature under the control of a secure operating mode of the computer 110. The memory 202 may be made inaccessible to any program executed by another execution environment such as the operating system or the kernel. The kernel typically runs when the computer 110 is booting. By way of example, x86 processors from Intel™ can be operated in several modes, or rings of execution. Ring 0 is occupied by the kernel, Ring 3 is occupied by the operating system. A third mode SMM/SM (system management mode) is occupied by the BIOS. The program with access to the secure memory 202 may be run in the SMM/SM because it is out of reach of the kernel, but would require securing the BIOS.

Another method of securing the memory 202 may be to create another mode of execution, for example, a Mode Z or Ring −1. The memory 202 may be partitioned according to function such that some areas of memory 202 are only accessible by Mode Z, whereas other areas of memory 202 are read-only from Ring 0. There may be case-specific access to memory 202, such as read access from Ring 0, but only when not in Mode Z. For example, keys 216 may be read-only from Ring 0, but are inaccessible when in Mode Z.

The isolated computing environment 125 may serve to host functions related to provisioning and activating licensed or pay-per-use resources. Such resources may include some or all of the above, for example, network connections 170 and 172, hard disk drive 141, or video interface 190. The isolated computing environment 125 may also host a balance manager that maintains an accounting of pay-per-use resources used and available.

The verification program 218 may monitor or measure a state of the computer 110. The state of the computer 110 may be used to determine the level of compliance of the computer 110 with a set of policies or pre-determined conditions. The pre-determined conditions may be both positive and negative, that is, the policy or condition may require the presence of certain elements, be they hardware, software, peripherals, etc. or the policy may prohibit the presence of certain other elements. For example, one policy may require the presence of a given version of a system driver, while another policy may prohibit the presence of an alternative boot device. To determine compliance, the verification program 218 may monitor the state of a resource used by the operating system, the state of an application program, the state of a BIOS structure or a BIOS extension.

The clock 206 may provide a reliable measure for pay-per-use terms involving periods of time, for example, unlimited use for a month. The clock may also act as a trigger to ensure that the verification and/or enforcement programs 218 and 220 of the isolated computing environment 125 receive enough processor execution cycles to perform their respective tasks. The trigger function may cause the logic circuit 204 to force execution of the verification program 218. The logic circuit may force an interrupt that causes the processing unit to execute from the validation program 218 from the appropriate location.

When the verification program determines non-compliance, a corrective action may instituted. For example, the enforcement program may cause a non-compliant driver to be overwritten with a driver from a known location. Conversely, when the non-compliant state is not automatically correctable, a sanction may be imposed to encourage the user to bring the system into compliance. Sanctions may be invoked by the logic circuit 204 activating the enforcement program 220. To carry out the enforcement task, the isolated computing environment 125, under the direction of the enforcement program, may disable or otherwise sanction resources. The policy may vary according to the state of the computer and may include reducing the processing speed of the computer or reducing the functional operation of the computer, such as booting in "safe mode". The goal of sanctions is that they be recoverable, and more specifically, be recoverable by the user. However, certain policies may exist that call for disabling the computer 110 to the point that qualified service personnel with special equipment are required to restore service. This may be the case when it is determined that repeated hostile attacks have been attempted over a period of time, despite warnings.

Figure 3:
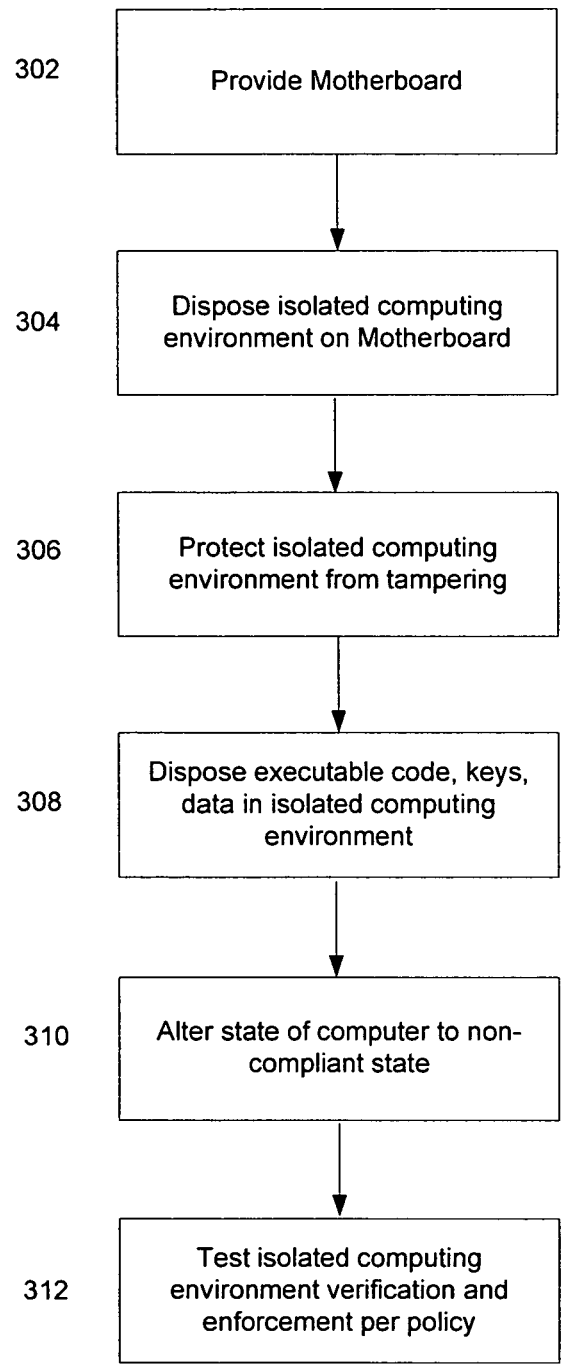
FIG. 3 is a flow chart depicting a method of binding an associated device to a computer.

FIG. 3 illustrates a method of assembling a computer 110 having an isolated computing environment 125. Along with other structural elements, a motherboard (not depicted) may be provided 302. The motherboard, as discussed above, may be a standard substrate with wiring traces and landing pads for attaching and connecting circuit components. Bare boards, as well as populated and semi-populated motherboards are readily available in the commercial and retail marketplaces. An isolated computing environment 125 may be disposed 304 on the motherboard. The isolated computing environment 125 may be a discrete component, such as a custom integrated circuit, a combination of components, for example, a multi-chip module (MCM), or fully integrated on the processing unit 120 chip.

When disposed on the motherboard, the isolated computing environment 125 may be protected 306 from tampering. Tamper-resistant mechanisms are known, but may include potting in epoxy and sandwiching underneath other components. To discourage key theft, metal coatings may be applied to prevent laser probing. As discussed above, the isolated computing environment 125 itself may have separate measures to protect the integrity of its own circuitry and contents.

Before or after disposing 304 on the motherboard, the isolated computing environment 125 may be initialized 308 with executable code, such as verification and enforcement program code 218 and 220. The function of the verification and enforcement programs is discussed above. In addition, keys and other data, such as certificates and known hash codes may be downloaded or injected. Injection usually occurs early in the manufacturing process, such as during chip testing. Later downloading may require cryptographic authentication and/or secure channels.

When assembled, the computer 110 may be tested. To perform a test of isolated computing environment 125 function, one or more of the states of the computer may be altered 310. The alteration may include attaching an unauthorized peripheral, loading/executing unauthorized code, or configuring the computer 110 to operate past an expiration date. Testing 312 the isolated computing environment 125 may be done by determining correct function of the verification program 218 to identify the non-compliant state and that appropriate sanctions are imposed by the enforcement program 220.

We claim:

1. A computer that is adapted for pay-for-use operation, the computer comprising:
　a first unsecure memory;
　a display;
　a processor operatively coupled to the first unsecure memory and the display;
　an isolated computing environment that is adapted to communicate with the processor and allow the computer to be used in pay-for-use operations, the isolated computing environment including:
　　a second memory that is different than the first unsecure memory, is operably coupled to the processor, and is inaccessible by unauthorized execution environments on the first unsecure memory, the unauthorized execution environments including at least an operating system of the computer,
　　a verification program stored in the second memory that is coded to monitor the computer, including the operating system, for any of a set of non-compliant conditions, the set of non-compliant conditions relating to pay-for-use operation of the computer, the set of non-compliant conditions comprising presence of a prohibited alternative boot device,
　　a logic circuit that causes execution of the verification program,
　　a clock that:
　　　provides the verification program with ensured processor cycles on the processor to monitor the computer; and
　　　triggers the logic circuit to force execution of the verification program via an interrupt that causes the processor to execute the verification program using the ensured processor cycles, and
　　an enforcement program stored in the second memory that is coded to, when the verification program determines the presence of an individual non-compliant condition from the set of non-compliant conditions on the computer, initiate a sanction against a user of the computer by maintaining operation of the computer at a reduced function level until the user corrects the individual non-compliant condition of the computer;
　wherein the isolated computing environment is further designed to support changes of state of the computer related to functions associated with provisioning resources for the pay-for-use operation;
　wherein the isolated computing environment is further designed so that the clock provides timing intervals for metering programs and expiration dates related to the pay-for-use operation of the computer; and
　wherein the isolated computing environment, including the second memory, is disposed on a motherboard that forms a part of the computer and is protected from tampering by unauthorized users of the computer by means of a tamper resistant mechanism.

2. The computer of claim 1, wherein the set of non-compliant conditions relate to a state of the operating system and validity of a basic input/output system (BIOS).

3. The computer of claim 1, wherein the verification program is one of a service and an application.

4. The computer of claim 1, wherein the tamper resistant mechanism comprises epoxy.

5. The computer of claim 1, further comprising a system bus connecting the processor and the first unsecure memory and a second, different bus connecting the second memory to the clock.

6. The computer of claim 1, the second memory being partitioned into a first area and a second area, wherein the first area can only be accessed from a first processor mode and the second area can only be accessed by a second, different processor mode.

7. The computer of claim 6, the first processor mode comprising an x86 ring 0 mode.

8. The computer of claim 1, the set of non-compliant conditions comprising noncompliance with a usage policy relating to contractual terms of a pay-per-use contract for the pay-per-use operation of the computer.

* * * * *